J. STANLEY.
Bridle-Bit.
No. 224,851. Patented Feb. 24, 1880.
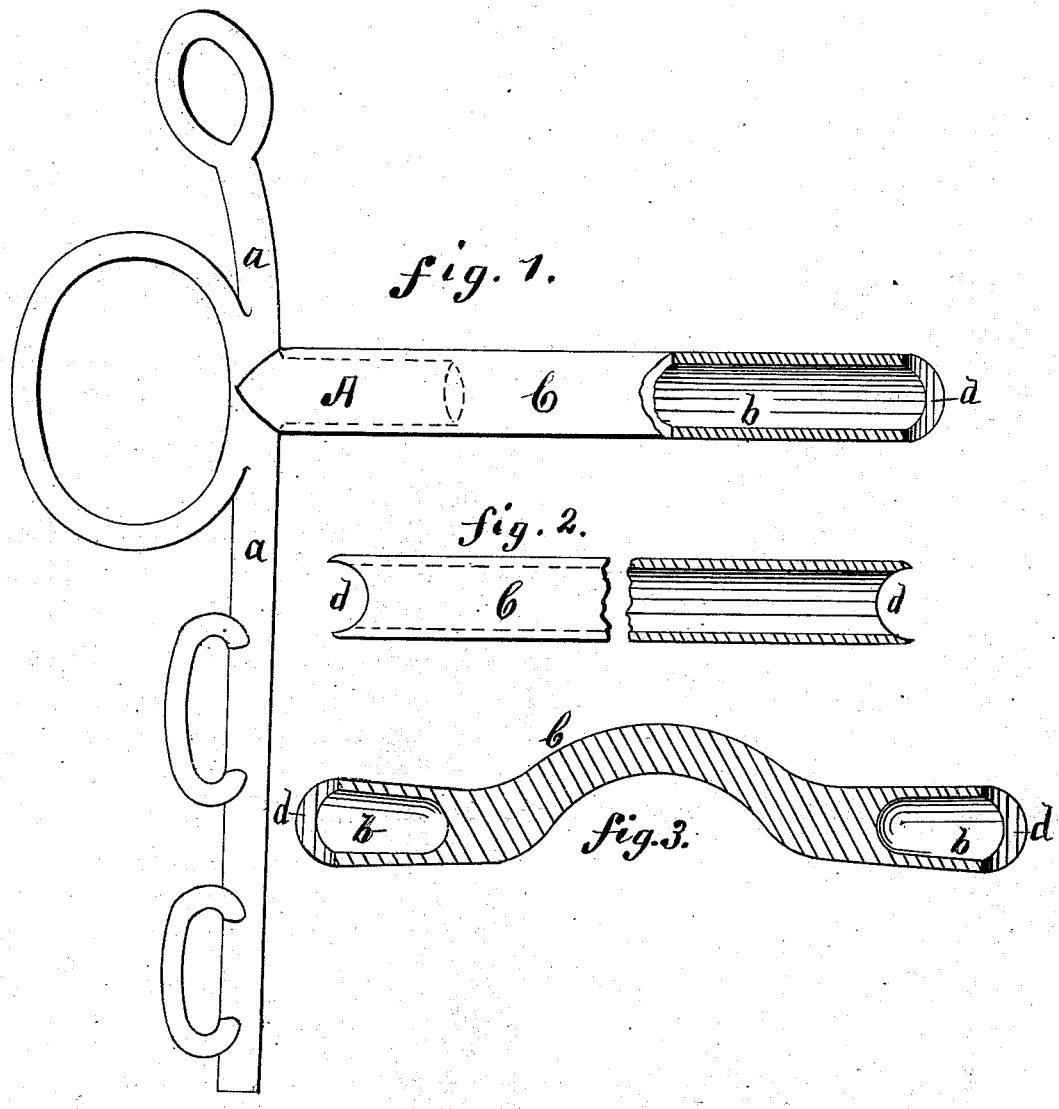

UNITED STATES PATENT OFFICE.

JAMES STANLEY, OF NEWARK, NEW JERSEY.

BRIDLE-BIT.

SPECIFICATION forming part of Letters Patent No. 224,851, dated February 24, 1880.

Application filed November 29, 1879.

*To all whom it may concern:*

Be it known that I, JAMES STANLEY, of the city of Newark, in the county of Essex and State of New Jersey, have invented certain new and useful Improvements in Bridle-Bits; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to secure a bit possessing great strength and lightness, and yet capable of being produced at a smaller cost.

The invention consists in a bridle-bit composed of a cheek-piece having a shank adapted to fit snugly into a hollow or socketed mouth-piece, the parts being brazed, soldered, or welded together, as will be hereinafter more fully and specifically set forth.

Referring to the accompanying drawings, Figure 1 is a perspective elevation indicating the component parts of my bit. Fig. 2 is the mouth-piece, partially in section, and showing grooved ends conforming to and formed for the reception of the bar of the cheek-piece; and Fig. 3 is another variety of mouth-piece in section, showing sockets for the reception of a shank which projects from the bar of the cheek-piece.

In carrying out my invention I cast or otherwise rigidly form upon the bar $a$ of the cheek-piece, in the manner indicated by the dotted lines, Fig. 1, the projecting shank A, which fits closely in the socket $b$, or other aperture prepared to receive it. I also prepare a notch or groove, $d$, transversely upon the ends of the mouth-piece in such a manner as to allow a part of the metal of said mouth-piece C to project around the sides of said bar $a$ of the cheek-piece. Having thus prepared the cheek and mouth pieces of the bit, I braze or otherwise permanently unite them together, as above stated, and thus produce a combination of great strength and lightness and at a comparatively limited cost.

As is apparent, I can either use a solid mouth-piece with sockets, as indicated in Fig. 3, or I can use a tubular mouth-piece, as in Figs. 1 and 2. The latter method secures a mouth-piece of a desirably-large diameter and of great strength and lightness by the expenditure of a comparatively-small amount of metal, as will be readily understood.

It will also be apparent that the union made by the shank A projecting into the socket $b$ and the sides of the groove $d$ overlapping the bar $a$, and the whole brazed together as set forth, forms a combination of remarkable strength.

It is manifest that the shank and socket may be reversed—*i. e.*, the socket be connected with the cheek-piece and the shank projecting from the mouth-piece—and substantially the same result be attained.

I do not claim, broadly, a hollow or socketed mouth-piece, nor a shank connected with a cheek-piece inserted therein; but

I claim—

1. A bridle-bit composed of a hollow or socketed mouth-piece and a cheek-piece having a shank cast or otherwise rigidly formed thereon and adapted to fit snugly into said mouth-piece, the parts being permanently brazed or welded together, as and for the purposes set forth.

2. The combination of the hollow or socketed mouth-piece having its ends grooved transversely, and the cheek-piece having a shank cast or otherwise rigidly formed thereon and adapted to fit snugly into said hollow and grooved mouth-piece, the parts being permanently brazed or welded together, as and for the purposes set forth.

In testimony that I claim the foregoing I have hereunto set my hand this 24th day of November, 1879.

JAMES STANLEY.

Witnesses:
OLIVER DRAKE,
CHARLES H. PELL.